(12) United States Patent
Nukui

(10) Patent No.: US 9,130,343 B2
(45) Date of Patent: Sep. 8, 2015

(54) GAS LASER OSCILLATOR HAVING FUNCTION OF JUDGING START OF DISCHARGE

(71) Applicant: FANUC CORPORATION, Minamitsuru-Gun, Yamanashi (JP)

(72) Inventor: Tooru Nukui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/223,233

(22) Filed: Mar. 24, 2014

(65) Prior Publication Data

US 2014/0294027 A1   Oct. 2, 2014

(30) Foreign Application Priority Data

Mar. 26, 2013   (JP) ................................. 2013-063776

(51) Int. Cl.
*H01S 3/00*     (2006.01)
*H01S 3/097*    (2006.01)
*H01S 3/07*     (2006.01)
*H01S 3/036*    (2006.01)

(52) U.S. Cl.
CPC ........... *H01S 3/09702* (2013.01); *H01S 3/0014* (2013.01); *H01S 3/036* (2013.01); *H01S 3/073* (2013.01); *H01S 3/09705* (2013.01)

(58) Field of Classification Search
CPC ... H01S 3/036; H01S 3/09702; H01S 3/0014; H01S 3/0407; H01S 3/041; H01S 3/073; H01S 3/09705; H01S 3/104; H01S 3/2232

USPC ........................................................ 372/38.02
See application file for complete search history.

(56) References Cited

U.S. PATENT DOCUMENTS 7,830,935 B2 * 11/2010 Ando et al. ................ 372/38.02
2011/0243168 A1 * 10/2011 Ikemoto et al. ............ 372/38.07
2012/0212542 A1 * 8/2012 Kimura .......................... 347/33

FOREIGN PATENT DOCUMENTS

JP      2011-222586     11/2011

* cited by examiner

*Primary Examiner* — Colleen A Matthews
*Assistant Examiner* — Vu A Vu
(74) *Attorney, Agent, or Firm* — RatnerPrestia

(57) ABSTRACT

A gas laser oscillator including a discharge tube provided in a gas channel through which a laser gas circulates; an output command part outputting a power output command; a power supply part applying to the discharge tube a discharge tube voltage corresponding to a power output command value; a voltage detector detecting the discharge tube voltage; and a discharge start judging part judging if a discharge has been started in the discharge tube based on a ratio of change of the discharge tube voltage. The output command part increases the power output command value in steps by an increment obtained by dividing a power output command value corresponding to a discharge start voltage serving as a predetermined reference by a number of steps of 2 or more, at a step time interval determined by using as a reference the time required until the power supply part responds to the power output command.

3 Claims, 4 Drawing Sheets

GAS LASER OSCILLATOR HAVING FUNCTION OF JUDGING START OF DISCHARGE

BACKGROUND OF THE INVENTION

1. Field of the Invention

The present invention relates to a gas laser oscillator which has a function of judging a start of discharge.

2. Description of the Related Art

In the past, there has been known a gas laser oscillator which stores in advance a ratio of change of a discharge tube voltage relative to a command voltage to the laser power supply when discharge is normally carried out and judges that discharge has started when the difference between this ratio of change and the ratio of change of the discharge tube voltage which is measured when increasing the command voltage becomes within a threshold value. This gas laser oscillator is, for example, described in Japanese Unexamined Patent Publication No. 2011-222586A (JP2011-222586A). In the gas laser oscillator described in JP2011-222586A, the command voltage is made to increase in steps at a first time interval (for example, 0.1 sec to 1 sec) and a pulse-like command voltage (pulse voltage) is superposed over a head part of each step voltage at a second time interval (for example, 10 μsec to 100 μsec).

However, if the pulse voltage is superposed over the step voltage as the command voltage like in the gas laser oscillator described in JP2011-222586A, the current which flows through the laser power supply is liable to overshoot and overcurrent is liable to flow to the power device in the laser power supply. In order to prevent this, it is necessary to gradually increase the command voltage until start of discharge is judged. Therefore, a relatively long time is required for shift from a laser standby state to a laser working state.

SUMMARY OF THE INVENTION

In one aspect of the present invention, a gas laser oscillator includes a discharge tube provided in a gas channel through which a laser gas circulates, an output command part outputting a power output command, a power supply part applying to the discharge tube a discharge tube voltage corresponding to a power output command value output from the output command part, a voltage detector detecting the discharge tube voltage, and a discharge start judging part judging if a discharge has been started in the discharge tube, based on a ratio of change of the discharge tube voltage detected by the voltage detector relative to the power output command value output from the output command part. The output command part increases the power output command value in steps by an increment at a step time interval, the step time interval being determined by using as a reference the time required until the power supply part responds to the power output command, the increment in the power output command value being obtained by dividing a power output command value corresponding to a discharge start voltage serving as a predetermined reference by a number of steps of 2 or more.

In another aspect of the present invention, a gas laser oscillator includes a discharge tube provided in a gas channel through which a laser gas circulates, an output command part outputting a power output command, a power supply part applying to the discharge tube a discharge tube voltage corresponding to a power output command value output from the output command part, a voltage detector detecting the discharge tube voltage, a discharge start judging part judging if a discharge has been started in the discharge tube, based on a ratio of change of the discharge tube voltage detected by the voltage detector relative to the power output command value output from the output command part, and a gas pressure adjusting part adjusts a laser gas pressure in the gas channel. The output command part outputs the power output command when the start of discharge is commanded, while the gas pressure adjusting part gradually reduces the laser gas pressure in the gas channel along with an increase in a standby time before the power output command is output.

BRIEF DESCRIPTION OF THE DRAWINGS

The objects, features, and advantages of the present invention will become clearer from the following description of embodiments in relation to the attached drawings, in which.

DETAILED DESCRIPTION

First Embodiment

Figure 1:
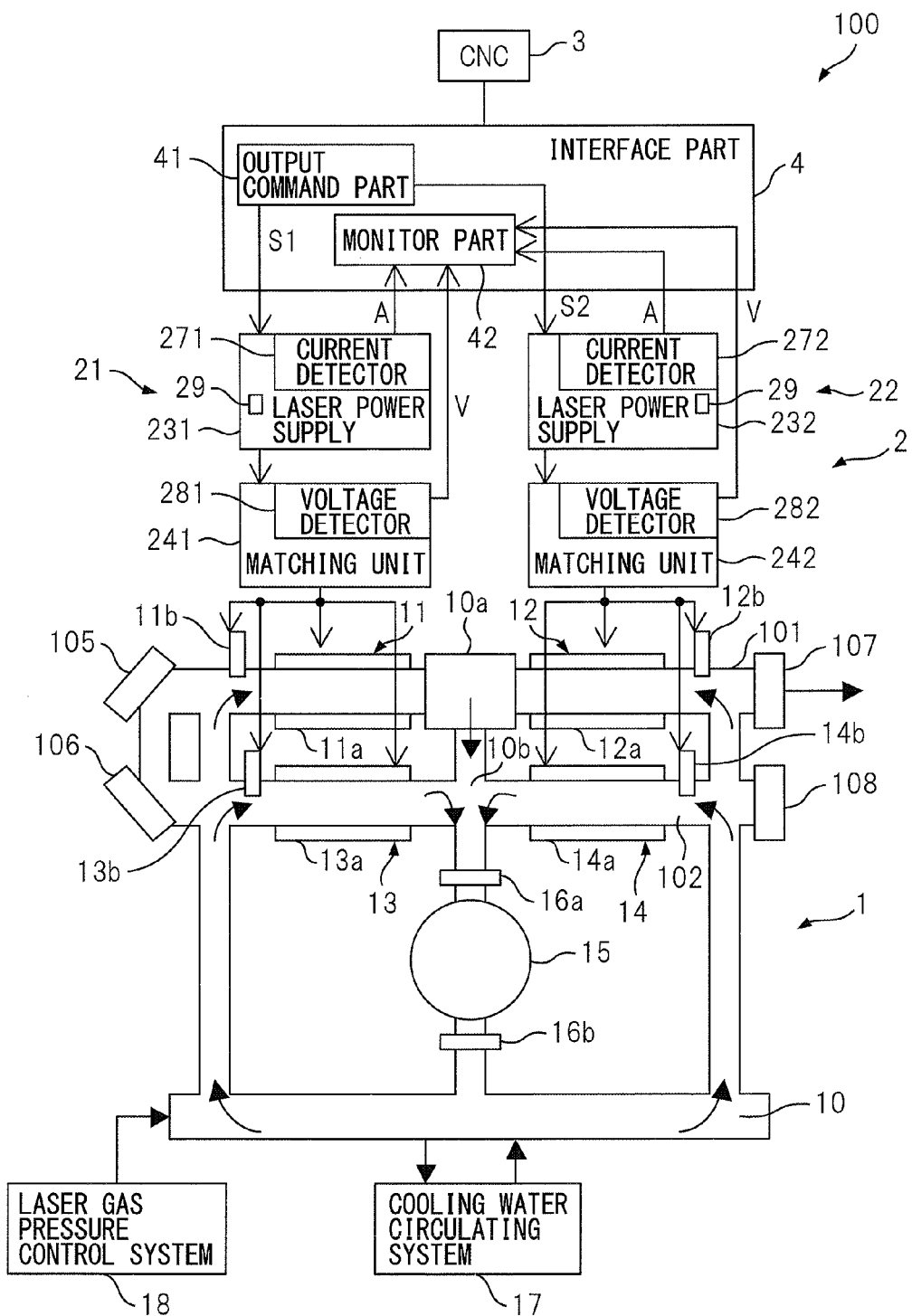
FIG. 1 is a view which shows the schematic configuration of a gas laser oscillator according to a first embodiment of the present invention.

Below, referring to FIG. 1 to FIG. 4B, a first embodiment of a gas laser oscillator according to the present invention will be explained. FIG. 1 is a view which shows the schematic configuration of a gas laser oscillator 100 according to the first embodiment of the present invention. This gas laser oscillator 100 is provided with a resonator 1, a power supply part 2 which supplies power to discharge tubes 11 to 14 of the resonator 1, a numerical control part (CNC) 3 which controls the overall operation of the gas laser oscillator 100, and an interface part 4 which communicates between the power supply part 2 and the CNC 3.

The resonator 1 has a gas channel 10 through which a laser medium constituted by a laser gas circulates. The laser gas is, for example, carbon dioxide, helium, and nitrogen mixed in a predetermined ratio of composition. The gas channel 10 has a first channel 101 which has a discharge tube holder 10a and a second channel 102 which is formed in parallel with the first channel 101 and is provided with a discharge tube holder 10b. The first channel 101 is provided with a pair of discharge tubes 11 and 12 straddling the discharge tube holder 10a, while the second channel 102 is provided with a pair of discharge tubes 13 and 14 straddling the discharge tube holder 10b.

The end parts at the discharge tube 11 and 13 sides are respectively provided with aliasing mirrors 105 and 106. The end part at the discharge tube 12 side is provided with an output mirror 107, while the end part at the discharge tube 14 side is provided with a rear mirror 108. The discharge tubes 11 to 14 respectively have pairs of main electrodes 11a to 14a which are arranged facing each other across the channels 101 and 102. The sides of the main electrodes 11a to 14a in the channel direction (upstream sides in directions of flow of laser gas) are respectively provided with auxiliary electrodes 11b to 14b. The main electrodes 11a to 14a and the auxiliary electrodes 11b to 14b are supplied with high frequency power from the power supply part 2.

The gas channel 10 is provided with a turbo blower 15. Due to the rotation of the turbo blower 15, as shown by the arrow in the figure, laser gas is sucked in from first end sides of the discharge tubes 11 to 14 and exhausted from the turbo blower 15. The laser gas exhausted from the turbo blower 15 is supplied to the other end sides of the discharge tubes 11 to 14 and circulate through the gas channel 10.

At the upstream side and the downstream side of the turbo blower 15, heat exchangers 16a and 16b are provided. The laser gas which circulates through the gas channel 10 is cooled by the heat exchangers 16a and 16b. The heat exchangers 16a and 16b are supplied by a cooling water circulating system 17 with a cooling medium constituted by cooling water. The pressure of the laser gas inside the gas channel 10 is controlled by a laser gas pressure control system 18 which supplies and exhausts the laser gas. That is, the laser gas pressure control system 18 has a control valve which supplies and exhausts the laser gas. The control valve is opened and closed to control the laser gas pressure.

The power supply part 2 has a first power supply part 21 which supplies voltage to the discharge tubes 11 and 13 (main electrodes 11a and 13a and auxiliary electrodes 11b and 13b) and a second power supply part 22 which supplies voltage to the discharge tubes 12 and 14 (main electrodes 12a and 14a and auxiliary electrodes 12b and 14b). The first power supply part 21 has a laser power supply 231 and matching unit 241, while the second power supply part 22 has a laser power supply 232 and a matching unit 242. The configurations of the laser power supplies 231 and 232 are the same as each other. The configurations of the matching units 241 and 242 are also the same as each other. Below, the laser power supplies 231 and 232 will also be indicated by the reference numeral 23, while the matching units 241 and 242 will also be indicated by the reference numeral 24.

The laser power supplies 231 and 232 respectively have current detectors 271 and 272 which detect the DC current "A", while the matching units 241 and 242 respectively have voltage detectors 281 and 282 which detect the discharge tube voltage V. Furthermore, the laser power supplies 231 and 232 respectively have self protection circuits 29. The self protection circuits 29 are overcurrent prevention circuits. When DC currents A which are detected by the current detectors 271 and 272 reach the threshold values A1 which are set by the circuits, the overcurrent prevention circuits operate so as to stop the output of DC current "A" regardless of the power output command value and lower the discharge tube voltage V to 0V. Due to this, the operation of the gas laser oscillator 100 is forcibly stopped, the DC current A is cut, and the laser power supplies 231 and 232 are prevented from being damaged due to overcurrent. Such an operation for shutting down the gas laser oscillator 100 is called an "alarm shutdown".

The interface part 4 has an output command part 41 which outputs respective power output command values S1 and S2 to the laser power supplies 231 and 232 and a monitor part 42 which obtains signals from the current detectors 271 and 272 and the voltage detectors 281 and 282. Below, the power output command values S1 and S2 will sometimes be referred to all together as simply the "S". The laser power supplies 231 and 232 apply discharge tube voltages corresponding to the power output command values S1 and S2 to the main electrodes 11a to 14a and the auxiliary electrodes 11b to 14b.

If power is supplied to the main electrodes 11a to 14a, discharge is started in the laser gas in the discharge tubes 11 to 14. Due to this main discharge, the laser gas is excited whereby light is generated, resonance occurs between the output mirror 107 and the rear mirror 108 whereby the light is amplified by stimulated emission, and part is taken out from the output mirror 107. The laser light which is taken out is used for laser working, etc. Below, the laser state where the laser oscillator 100 can output a laser beam will be called the "laser working state", while the state where it cannot output a laser beam will be called the "laser standby state". In the laser standby state, the main electrodes 11a to 14a and auxiliary electrodes 11b to 14b are not supplied with voltage from the power supply part 2 and both the main discharge and auxiliary discharge are extinguished.

On the other hand, in the laser working state, even if the laser output is zero (0 W), the power supply part 2 continues to supply the main electrodes 11a to 14a and auxiliary electrodes 11b to 14b with a certain amount of power. The amount of power which is supplied is adjusted to a state where main discharge by the main electrodes 11a to 14a is extinguished and only auxiliary discharge by the auxiliary electrodes 11b to 14b is started. This auxiliary discharge does not directly contribute to laser output since it is a weak discharge, but is maintained as auxiliary discharge for facilitating the start of main discharge even in a state where the laser output is zero (0 W) and the main discharge has been extinguished (state of base discharge). That is, even when the laser output is zero, so long as the gas laser oscillator 100 is not completely shut down, the power supply part 2 outputs standby power whereby auxiliary discharge is maintained.

By making the laser working state where such auxiliary discharge is started, when laser power supplies 23 are given a power output command, it is possible to match the impedance of the laser power supplies 23 and the discharge load. As opposed to this, if the laser power supplies 23 are given an output command (beam firing) in the state where auxiliary discharge has not been started, impedance cannot be matched between the laser power supplies 23 and the discharge load and the discharge tubes 11 to 14 are given excessive voltage. As a result, overcurrent flows to the laser power supplies 23 and the laser power supplies 23 are liable to be damaged or an alarm shutdown is liable to be initiated.

Figure 2:
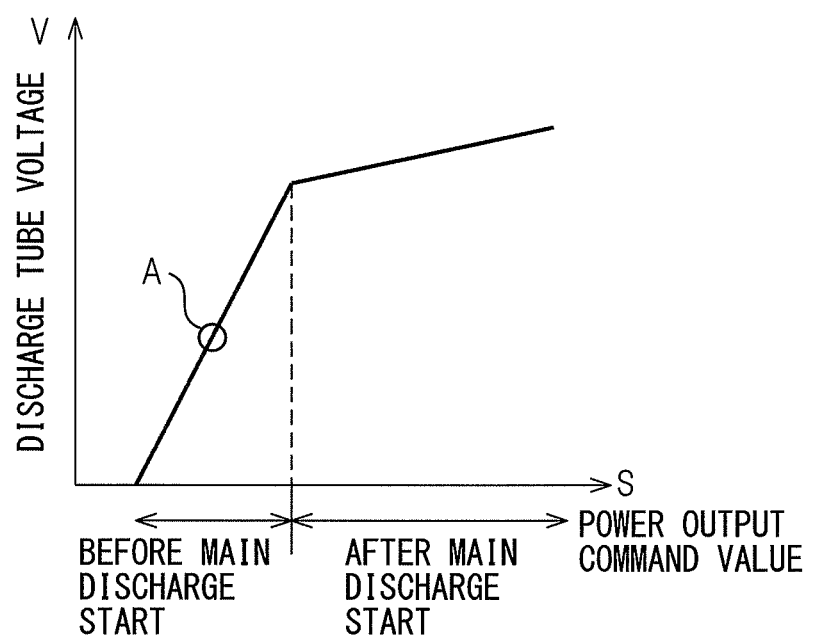
FIG. 2 is a view which shows a relationship between a power output command value and a discharge tube voltage.

FIG. 2 is a view which shows the relationship between a power output command value S and a discharge tube voltage V which is detected by the voltage detectors 281 and 282. As shown in FIG. 2, if the power output command value S is made to rise from the laser standby state where the discharge tube voltage V is 0V, the discharge tube voltage V increases. If main discharge is started, the ratio of change of the discharge tube voltage V relative to the power output command value S (inclination of curve) becomes smaller. Therefore, it is possible to determine in advance the ratio of change (reference ratio of change) of the discharge tube voltage relative to the power output command value S at normal times (for example, at the time of factory shipment or at the time of past normal operation) and judge start of discharge when the difference between ratio of change of the discharge tube voltage V relative to the power output command value S and the reference ratio of change becomes within a predetermined threshold value.

The auxiliary discharge has already been started before the main discharge is started. For example, at the point A of FIG. 2, the auxiliary discharge is started. However, at the time of start of auxiliary discharge, no remarkable change is seen in the ratio of change of the discharge tube voltage V, so judging the start of only auxiliary discharge would be difficult. Therefore, the start of main discharge is judged so as to simultaneously judge the start of auxiliary discharge. After this start of main discharge is judged, the power output command value is lowered by exactly a predetermined amount or a predetermined ratio and the main discharge is extinguished whereby it is possible to obtain a laser working state in which only auxiliary discharge is started.

In this regard, in the laser working state, power is consumed for starting the auxiliary discharge. For this reason, from the viewpoint of reducing the power consumption, for example, it is preferable to maintain as much as possible the laser standby state (state where main discharge and auxiliary discharge are extinguished) other than times of laser working operations such as a case where a certain working operation is ended and the next working operation is shifted to and other. However, if time is taken for return from the laser standby state to the laser working state, a drop in the working efficiency will be invited. On the other hand, if ceasing the shift to the laser standby state so as to keep down a drop in the working efficiency, the laser working state will become protracted and the power consumption cannot be reduced. Therefore, in the present embodiment, in order to enable an operation for returning from the laser standby state to the laser working state in a short time, the power output command to the laser power supplies 23 is controlled in the following way.

Figure 3:
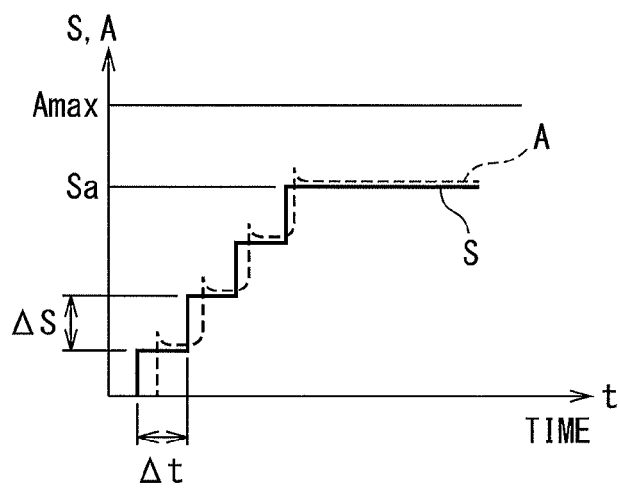
FIG. 3 is a view which shows an example of a control characteristic of a power output command value according to the gas laser oscillator of FIG. 1.

The power output command from the output command part 41 is controlled by the CNC 3. FIG. 3 is a view which shows one characteristic when shifting from the laser standby state to the laser working state in the gas laser oscillator 100 according to the present embodiment. The solid line in the figure shows the change along with time of the power output command value S, while the broken line shows the change along with time of the current "A" which flows through the power device of the power supply part 2.

As shown in FIG. 3, the CNC 3 increases the power output command value S in steps at predetermined time intervals $\Delta t$ (step time intervals) and by increments $\Delta S$ (command value increments) of the power output command value S. The time interval $\Delta t$ is determined in advance with reference to the time which is required for the power supply part 2 to respond to a power output command (response time). That is, $\Delta t$ is determined to be at least the response time and so that the time which is required for start of discharge becomes several seconds (for example, about 2 seconds). Specifically, if the response time is assumed to be 1 μsec, $\Delta t$ is set to 1 μsec to several tens of μsec, preferably 1 μsec to 10 μsec. It is also possible to set $\Delta t$ by a function having the response time as a parameter. For example, it is also possible to make the response time multiplied with a predetermined coefficient the $\Delta t$.

On the other hand, the command value increment $\Delta S$ is determined by the power output command value which corresponds to the discharge start voltage serving as a predetermined reference (reference command value Sa) and the target number of steps N of step increases. The discharge start voltage as the reference is, for example, the voltage at the time of start of discharge which is determined by experiments, analysis, etc. under the reference gas state (gas composition, gas temperature, etc.) The actual discharge start voltage changes depending on the gas state. The power output command value S at the time of start of discharge does not always match the reference command value Sa. However, in FIG. 3 is for convenience shown as matching.

The target number of steps N is at least 2 and is, for example, determined as 2 to 10 in range. In the example of FIG. 3, N=4. The CNC 3 calculates the command value increase $\Delta S$ by dividing the reference command value Sa by the target number of steps N. Further, it outputs a control signal to the output command part 41 so that the power output command value S increases by exactly the amount of the command value increment $\Delta s$ with each elapse of time of exactly the amount of the time interval $\Delta t$ from when start of discharge is commanded.

Due to this, as shown in FIG. 3, the power output command value S which is output to the laser power supplies 23 increases in steps. The increase in steps of the power output command value S is continued until the ratio of change of the discharge tube voltage V relative to the power output command value S becomes small and the CNC 3 judges the start of discharge. If the CNC 3 judges the start of discharge, it stops the step-wise increase in the power output command value S and shifts to the laser working state.

At the time of start of discharge, if the power output command value S increases in steps, the current "A" which flows through the power device increases for an instant and overshoot of current such as shown in FIG. 3 occurs. This overshoot becomes larger the larger the command value increment $\Delta S$. In the present embodiment, the power output command value S is made to rise in 2 or more steps, so the command value increment $\Delta S$ is small and overshoot can be suppressed. As a result, the maximum value of the current "A" which flows through the power device becomes less than the current at which the overcurrent prevention circuit operates (overcurrent limit value Amax) and alarm shutdown at the time of start of discharge can be prevented.

Further, in the present embodiment, the time interval $\Delta t$ for the step increases is set to a short time (for example, 1 μsec to 10 μsec or so) considering the response time of the power supply part 2, so it is possible to greatly shorten the time required for the start of discharge. As a result, it is possible to immediately shift from the laser standby state to the laser working state and possible to reduce the power consumption without causing a drop in the working efficiency. That is, the time of the laser standby state where the main discharge and auxiliary discharge are extinguished becomes longer and the power consumption can be improved.

Figure 4A:
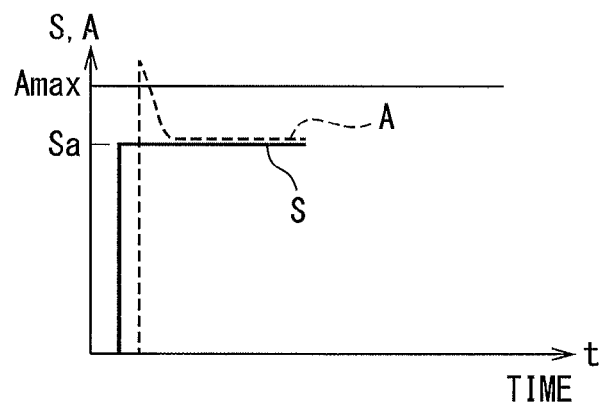
FIG. 4A is a view which shows a comparative example of FIG. 3.
Figure 4B:
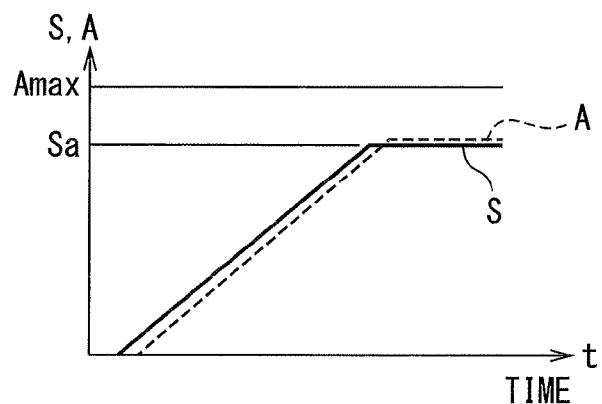
FIG. 4B is a view which shows another comparative example of FIG. 3.

As opposed to this, as shown in FIG. 4A, for example, when raising the power output command value S to a level corresponding to the reference command value Sa in a single step (solid line), the amount of overshoot of the current "A" which flows through the power device (broken line) becomes larger and the maximum value of the current "A" is liable to exceed the overcurrent limit value Amax. As a result, the overcurrent prevention circuit operates and an alarm shutdown is caused. On the other hand, as shown by the solid line of FIG. 4B, if making the power output command value S gradually rise until discharge is started (solid line), it is possible to suppress overshoot of the current "A" which flows through the power device (broken line). However, in this case, a relatively long time is taken until start of discharge.

Second Embodiment

Figure 5:
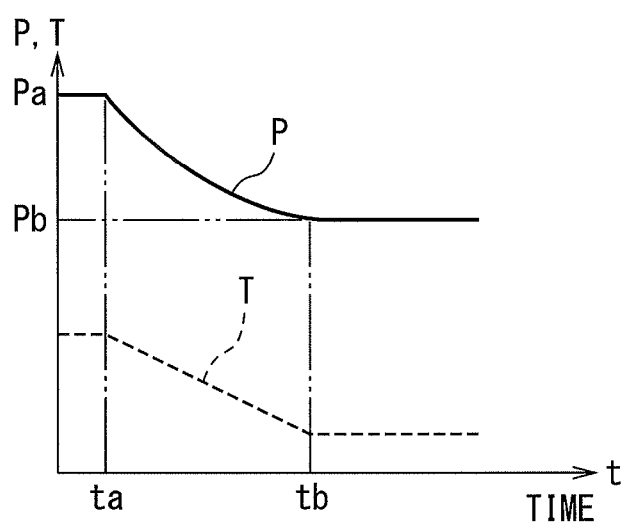
FIG. 5 is a view which shows one example of a control characteristic of laser gas pressure according to a gas laser oscillator according to a second embodiment of the present invention.

Referring to FIG. 5, a second embodiment of the present invention will be explained. Below, the points of difference from the first embodiment will mainly be explained. In the second embodiment, the deterioration in the start of discharge along with the elapse of time in the laser standby state is considered. That is, if the laser standby time becomes longer, the laser gas temperature and the temperature inside of the laser oscillator fall, discharge becomes harder to start, and a longer time is required until return to the laser working state. Further, due to the effects of the discharge load (gas composition, gas temperature, etc.), the variation in the return time from the laser standby state to the laser working state also becomes larger. Considering this point, early return to the laser working state, even if the laser standby time is long, is made possible in the second embodiment.

In the second embodiment, the CNC 3 controls a control valve of the laser gas pressure control system 18 and controls the laser gas pressure inside the gas channel 10. That is, in the laser working state, the laser gas pressure control system 18 operates to control the intake amount and exhaust amount of the laser gas so that the laser gas pressure in the gas channel 10 becomes a predetermined working gas pressure. On the other hand, in the laser standby state, the supply of laser gas to the gas channel 10 is cut and the laser gas pressure is gradually reduced along with a predetermined control characteristic.

The solid line of FIG. 5 shows the control characteristic of the laser gas pressure P in the laser standby state. The broken line of FIG. 5 shows the change in the laser gas temperature T. As shown in FIG. 5, in the present embodiments, along with the elapse of the standby time, the laser gas pressure P is gradually reduced. More strictly, after shifting to the laser standby state, until the predetermined time to elapses, the laser gas pressure P is held at the predetermined working gas pressure Pa, and then until the laser gas pressure P reaches the predetermined standby gas pressure Pb, the laser gas pressure P is gradually reduced along with the elapse of time. If the laser gas pressure P reaches the standby gas pressure Pb, after this, the operation of the laser gas pressure control system 18 is restarted and the laser gas pressure P is maintained at the standby gas pressure Pb. This control characteristic corresponds to the characteristic of the laser gas temperature of FIG. 5.

At this time, the difference between the working gas pressure Pa and the standby gas pressure Pb is, for example, 10 hPa or so. Since the laser gas pressure P is lower than atmospheric pressure, a vacuum pump is used to lower the laser gas pressure P. By gradually making the laser gas pressure P lower along with the elapse of the standby time, the start of discharge can be promoted and, as shown in FIG. 3, the power output command value S can be made to increase in steps so as to suppress the delay in the reset time and the variation in return time when resetting the laser working state.

In the second embodiment, since laser gas is exhausted from the gas channel 10 in the laser standby state, when returning to the laser working state, the laser gas pressure P becomes insufficient by the amount of exhaust during standby. However, if raising the voltage which is applied to the discharge tubes 11 to 14 for laser working, the laser gas temperature T instantaneously rises and the laser gas expands. Due to this, the laser gas pressure P can be easily returned to the predetermined working gas pressure. Further, the laser gas pressure P in the laser standby state is smaller than atmospheric pressure, so by supplying laser gas from the high pressure gas tank through the control valve, the laser gas pressure P can be immediately returned to the working gas pressure.

The pattern of increase of the power output command value S in the above second embodiment may be made one different from that of FIG. 3. That is, if the gas laser oscillator 100 is provided with a laser gas pressure control system 18 (gas pressure adjusting part) which adjusts the laser gas pressure P inside the gas gas channel 10 and the CNC 3 controls the gas pressure adjusting part so as to gradually reduce the laser gas pressure P in the gas channel 10 along with the increase in the standby time before the output command part 41 outputs the power output command, as shown in FIG. 3, rather than using the time interval Δt and the command value increase ΔS to make the power output command value S increase in steps, it is possible to use other parameters to make the power output command value increase.

In the above embodiments (FIG. 1), the gas laser oscillator 100 is designed provided with a plurality of power supply parts 21 and 22 and a plurality of discharge tubes 11 to 14. However, the numbers of the power supply parts and the discharge tubes are not limited to the ones explained above. For example, there may be a single power supply part or there may be one each of the power supply part and the discharge tube. In the above embodiments, the ratio of change of the discharge tube voltage V relative to the power output command value S at the time of normal operation (reference ratio of change) is determined in advance and stored, and the CNC 3 judges start of discharge when the difference of the ratio of change of the discharge tube voltage relative to the power output command value S and the reference ratio of change became within a predetermined threshold value. However, so long as using the ratio of change of the discharge tube voltage detected by the voltage detectors 281 and 282 relative to the power output command value S output from the output command part 41 as the basis to judge start of discharge, the discharge start judging part may be configured in any way.

The above embodiments may be combined with one or more of the above modifications.

According to the gas laser oscillator of the present invention, it is easy to shift from the laser standby state to the laser working state in a short time.

Above, the present invention was explained in relation to preferred embodiments, but a person skilled in the art would understand that various corrections and changes may be made without departing from the scope of disclosure of the later set forth claims.

The invention claimed is:

1. A gas laser oscillator comprising:
    a discharge tube provided in a gas channel through which a laser gas circulates;
    an output command part outputting a power output command value;
    a power supply part applying to the discharge tube a discharge tube voltage corresponding to the power output command value output from the output command part;
    a voltage detector detecting the discharge tube voltage; and
    a discharge start judging part judging if a discharge has been started in the discharge tube, based on a ratio of change of the discharge tube voltage detected by the voltage detector relative to the power output command value output from the output command part,
    wherein the output command part increases the power output command value in steps by an increment at a step time interval,
    the step time interval being determined at least by:
        according to a response time that is required for the power supply part to respond to the power output command value, and
        another increment in the power output command value being obtained by:
            dividing the power output command value corresponding to a discharge start voltage serving as a predetermined reference by a number of steps of 2 or more.

2. The gas laser oscillator according to claim 1, further comprising a gas pressure adjusting part adjusting a laser gas pressure in the gas channel,
    wherein the gas pressure adjusting part gradually reduces the laser gas pressure, from a working gas pressure to a standby gas pressure, in the gas channel along with an increase in a standby time before the power output command is output from the output command part.

3. A gas laser oscillator comprising:

a discharge tube provided in a gas channel through which a laser gas circulates;

an output command part outputting a power output command value;

a power supply part applying to the discharge tube a discharge tube voltage corresponding to the power output command value output from the output command part;

a voltage detector detecting the discharge tube voltage;

a discharge start judging part judging if a discharge has been started in the discharge tube, based on a ratio of change of the discharge tube voltage detected by the voltage detector relative to the power output command value output from the output command part; and a gas pressure adjusting part adjusting a laser gas pressure in the gas channel, wherein the gas pressure adjusting part gradually reduces the laser gas pressure, from a working gas pressure to a standby gas pressure, in the gas channel along with an increase in a standby time before the power output command is output.

\* \* \* \* \*